United States Patent
Hoang et al.

(10) Patent No.: US 10,382,332 B2
(45) Date of Patent: Aug. 13, 2019

(54) ROUTE SIGNALING AND CONVERGENCE IN EVPN OF PORT EXTENDERS

(71) Applicant: Juniper Networks, Inc., Sunnyvale, CA (US)

(72) Inventors: Levinh Hoang, Sunnyvale, CA (US); Vijayananda Jayaraman, Milpitas, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 64 days.

(21) Appl. No.: 15/593,449

(22) Filed: May 12, 2017

(65) Prior Publication Data

US 2018/0331953 A1 Nov. 15, 2018

(51) Int. Cl.
*H04L 12/28* (2006.01)
*H04L 12/741* (2013.01)
(Continued)

(52) U.S. Cl.
CPC ........ *H04L 45/745* (2013.01); *H04L 12/4625* (2013.01); *H04L 12/4641* (2013.01);
(Continued)

(58) Field of Classification Search
CPC ... H04L 45/245; H04L 12/4625; H04L 45/66; H04L 12/4641; H04L 61/6022;
(Continued)

(56) References Cited

U.S. PATENT DOCUMENTS 8,125,928 B2 * 2/2012 Mehta ................ H04L 12/4625
370/254

9,461,840 B2 * 10/2016 Chatwani ............ H04L 12/4625
(Continued)

FOREIGN PATENT DOCUMENTS

EP 2670090 A1 12/2013
EP 3065342 A1 9/2016

OTHER PUBLICATIONS

"IEEE Std 802.1 BR—IEEE Standard for Local and metropolitan area networks—Virtual Bridged Local Area Networks Bridge Port Extension," IEEE Standards Association, IEEE Computer Society, Jul. 16, 2012, 164 pp.
(Continued)

*Primary Examiner* — Sai Aung
(74) *Attorney, Agent, or Firm* — Shumaker & Sieffert, P.A.

(57) ABSTRACT

Techniques are described for forwarding traffic within an Ethernet Virtual Private Network (EVPN) fabric of port-extenders by modeling a port-extender as a port-extender Ethernet segment. For example, a method includes receiving, by a provider edge (PE) device of a plurality of PE devices configured with an EVPN instance reachable by a port-extender Ethernet segment connecting the plurality of PE devices to a port-extender device, an EVPN route including information identifying an extended-port of the port-extender device associated with the port-extender Ethernet segment; storing, by the PE device, the information identifying the extended-port of the port-extender device associated with the port-extender Ethernet segment; and generating, by the PE device, a packet header of a data packet to be forwarded toward the extended-port of the port-extender device, the packet header including the information identifying the extended-port of the port-extender device.

17 Claims, 9 Drawing Sheets

(51) Int. Cl.
   *H04L 12/46*   (2006.01)
   *H04L 12/713*  (2013.01)
   *H04L 12/715*  (2013.01)
   *H04L 12/721*  (2013.01)
   *H04L 12/723*  (2013.01)
   *H04L 29/06*   (2006.01)

(52) U.S. Cl.
   CPC .......... *H04L 12/4666* (2013.01); *H04L 45/50* (2013.01); *H04L 45/586* (2013.01); *H04L 45/64* (2013.01); *H04L 45/66* (2013.01); *H04L 63/0272* (2013.01); *H04L 69/22* (2013.01)

(58) Field of Classification Search
   CPC ... H04L 12/4633; H04L 45/02; H04L 45/586; H04L 49/70; H04L 29/12028; H04L 49/351
   See application file for complete search history.

(56) References Cited

U.S. PATENT DOCUMENTS

| | | | | |
|---|---|---|---|---|
| 2012/0014386 | A1* | 1/2012 | Xiong | H04L 29/12028 370/392 |
| 2012/0033668 | A1* | 2/2012 | Humphries | H04L 12/185 370/390 |
| 2012/0033669 | A1* | 2/2012 | Mohandas | H04L 45/245 370/392 |
| 2014/0003440 | A1* | 1/2014 | Hathorn | H04L 67/1097 370/401 |
| 2014/0269710 | A1* | 9/2014 | Sundaram | H04L 45/302 370/392 |

OTHER PUBLICATIONS

Sajassi et al., "BGP MPLS-Based Ethernet VPN," RFC 7432, Internet Engineering Task Force (IETF), Feb. 2015, 56 pp.
Bates et al., "Multiprotocol Extensions for BGP-4," RFC 4760, Network Working Group, Jan. 2007, 12 pp.
Sangli et al., "BGP Extended Communities Attribute," RFC 4360, Network Working Group, Feb. 2006, 12 pp.
Rosen et al., "IANA Registries for BGP Extended Communities," RFC 7153, Internet Engineering Task Force (IETF), Mar. 2014, 16 pp.
Sajassi et al., "BGP MPLS Based Ethernet VPN, draft-ietf-l2vpn-evpn-11," Internet—Draft, Network Working Group, Oct. 18, 2014, 52 pp.
"Simplify the Data Center with Junos Fusion—Juniper Networks Fabric Technology," White Paper, Juniper Networks, Inc., Feb. 2015, 7 pp.
Extended Search Report from counterpart European Application No. 18165146.4, dated Jul. 19, 2018, 13 pp.
Response filed May 14, 2019 to the Extended Search Report dated Jul. 19, 2018, from counterpart European Application No. 18165146.4, 14 pp.

* cited by examiner

ROUTE SIGNALING AND CONVERGENCE IN EVPN OF PORT EXTENDERS

TECHNICAL FIELD

The disclosure relates to computer networks and, more particularly, to routing packets within computer networks.

BACKGROUND

A computer network is a collection of interconnected computing devices that can exchange data and share resources. Example network devices include switches or other layer two (L2) devices that operate within the second layer of the Open Systems Interconnection (OSI) reference model, i.e., the data link layer, and routers or other layer three (L3) devices that operate within the third layer of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote L2 customer networks through an intermediate L3 network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices coupled to the customer edge (CE) devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the PE devices.

In an EVPN, L2 address learning (also referred to as "MAC learning") in a PE device occurs in the control plane rather than in the data plane (as happens with traditional bridging) using a routing protocol. For example, in EVPNs, a PE device typically uses the Border Gateway Protocol (BGP) (i.e., an L3 routing protocol) to advertise to other provider edge network devices the MAC addresses the PE device has learned from the local consumer edge network devices to which the PE device is connected. As one example, a PE device may use a BGP route advertisement message to announce reachability information for the EVPN, where the BGP route advertisement specifies one or more MAC addresses learned by the PE device instead of L3 routing information. Additional example information with respect to EVPN is described in "BGP MPLS-Based Ethernet VPN," Request for Comments (RFC) 7432, Internet Engineering Task Force (IETF), February 2015, the entire contents of which are incorporated herein by reference.

SUMMARY

In general, techniques are described for forwarding traffic within an Ethernet Virtual Private Network (EVPN) fabric of port-extenders by modeling a port-extender as an Ethernet segment. A plurality of provider edge (PE) devices may be configured to provide an EVPN instance to multiple customer networks via a port-extender and Ethernet segments connected to the PE devices. One or more of the customer networks may be connected to a port-extender that is multi-homed to multiple PE devices such that, for each such customer network, multiple PE devices may each have a local interface for an Ethernet segment coupling the PE devices to the customer network.

In some examples, a PE device of the multiple PE devices configured with the EVPN instance may receive, via a port-extender Ethernet segment, a packet for forwarding to a broadcast domain of the EVPN instance. Based on MAC advertisement (Type 2) and/or IGMP Join Synch (Type 7) EVPN routes, originated or received by the PE device, that advertise supplementary port granularity information for the port-extender ESI attribute, the PE device may send the packet with the port granularity information to a port-extender such that the port-extender may forward the packet on a particular port to a destination customer network.

In some examples, a PE device may also provide split-horizon based on port granularity information advertised by Type 2 and/or Type 7 EVPN routes. In one example, an Institute of Electrical and Electronics Engineers (IEEE) 802.1BR (herein referred to as "802.1BR") packet header communicated from a port-extender to an advertising PE device is included in a packet to be forwarded to the broadcast domain of the EVPN instance. A receiving PE device that receives the packet over an EVPN network may perform split-horizon based on the 802.1BR header to determine the extended-port from which the packet was originated. In another example, a PE device may determine a source MAC address from a packet from the port-extender and may compare a source MAC address included in Type 2 EVPN routes that include port information.

Implementing forwarding techniques in this way may provide one or more advantages. For example, PE devices may advertise Per-ESI Auto-Discovery (Type 1), and Ethernet Segment (Type 4) EVPN routes for only port-extender Ethernet segments rather than for all extender-ports connecting to CE devices, thereby reducing the size of the BGP route tables being advertised among the PE devices. PE devices may also advertise only one MPLS ESI label per port-extender rather than advertising MPLS ESI labels for each extended-port and port-extender Ethernet segment mapping, thereby reducing the number of MPLS ESI labels. As another example, a designated forwarder is elected for a port-extender, and shared with all the extended-ports of that device, thereby reducing the granularity of DF election, and the traffic convergence time following designated forwarder (DF) re-election.

In one example, a method includes receiving, by a PE device of a plurality of PE devices configured with an EVPN instance reachable by a port-extender Ethernet segment connecting the plurality of PE devices to a port-extender device, an EVPN route including information identifying an extended-port of the port-extender device associated with the port-extender Ethernet segment; storing, by the PE device, the information identifying the extended-port of the port-extender device associated with the port-extender Ethernet segment; and generating, by the PE device, a packet header for a data packet to be forwarded toward the extended-port of the port-extender device, the packet header including the information identifying the extended-port of the port-extender device.

In another example, a provider edge device includes a memory; and one or more processors operably coupled to the memory, wherein the one or more processors and memory are configured to: receive configuration data configuring the PE device with an EVPN instance reachable by a port-extender Ethernet segment connecting a plurality of PE devices, including the PE device, to a port-extender device, receive an EVPN route including information identifying an extended-port of the port-extender device associated with the port-extender Ethernet segment, store the information identifying the extended-port of the port-extender device associated with the port-extender Ethernet segment, and generate a packet header for a data packet to be forwarded toward the port-extender device, the packet header including the information identifying the extended-port of the port-extender device.

In another example, a computer-readable medium includes instructions for causing one or more programmable processors to: receive configuration data configuring the PE device with an Ethernet Virtual Private Network (EVPN) instance reachable by a port-extender Ethernet segment connecting a plurality of PE devices, including the PE device, to a port-extender device, receive an EVPN route including information identifying an extended-port of the port-extender device associated with the port-extender Ethernet segment, store the information identifying the extended-port of the port-extender device associated with the port-extender Ethernet segment, and generate a packet header for a data packet to be forwarded toward the port-extender device, the packet header including the information identifying the extended-port of the port-extender device.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
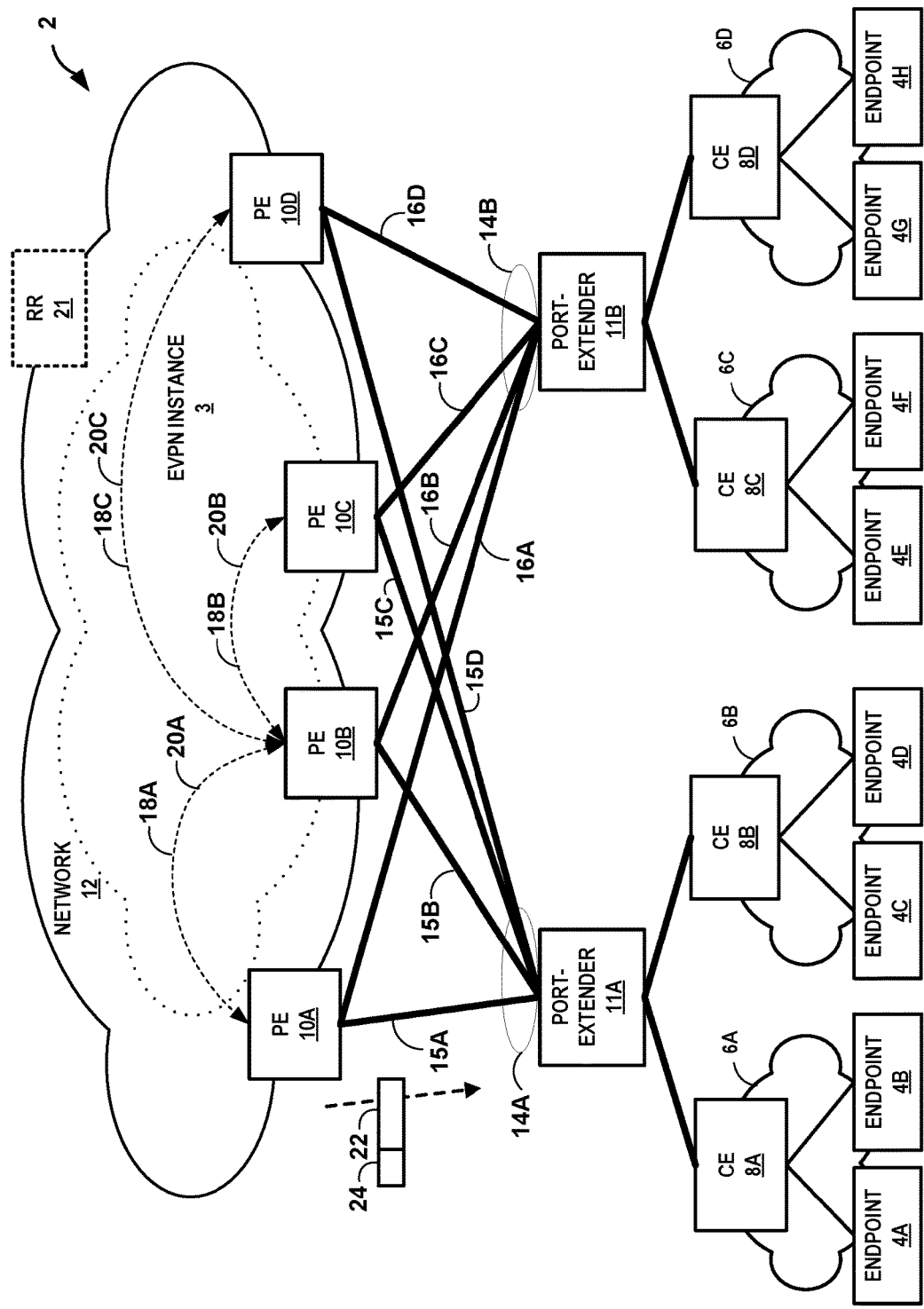
FIG. 1 is a block diagram illustrating an example system, in accordance with techniques described in this disclosure.

FIG. 1 is a block diagram illustrating an example system 2, in accordance with techniques described in this disclosure. In the example of FIG. 1, PE devices 10A-10D ("PE devices 10" or, more simply, "PEs 10") provide customer endpoints 4A-4H ("endpoints 4") associated with customer networks 6A-6D ("customer networks 6") with access to an intermediate layer 3 (L3) network 12 (alternatively referred to herein as the "core network 12" or the "EVPN network 12") via customer edge (CE) routers 8A-8D ("CE devices 8" or, more simply, "CEs 8").

Each of PEs 10 and CEs 8 may each represent a router, switch, or other suitable network devices that participates in a layer two (L2) virtual private network (VPN) (L2VPN) service, such as an EVPN. For illustration purposes, PEs 10 represent routers and CEs 8 represent switches in FIG. 1. Customer networks 6 may represent customer networks associated with one or more tenants of a data center that includes intermediate network 12. Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Each of endpoints 4 may be a host, server, virtual machine, container, or other source or destination for L2 traffic. The configuration of system 2 illustrated in FIG. 1 is merely an example. For example, system 2 may include any number of customer networks 6. Nonetheless, for ease of description, only customer networks 6A-6D are illustrated in FIG. 1. In some cases, any one or more of CEs 8 may be a customer endpoint or "host."

Intermediate network 12 may represent a service provider network that is owned and operated by a service provider, which is usually large telecommunications entity or corporation. Intermediate network 12 represents an L3 computer network, where reference to a layer followed by a number refers to a corresponding layer in the Open Systems Interconnection (OSI) model. Intermediate network 12 is an L3 network in the sense that it natively supports L3 operations as described in the OSI model. Common L3 operations include those performed in accordance with L3 protocols, such as the Internet protocol (IP). L3 is also known as a "network layer" in the Open Standards Interconnection model and the "IP layer" in the TCP/IP model, and the term L3 may be used interchangeably with the and "network layer" and "IP" throughout this disclosure. Intermediate network 12 may also implement MPLS, Generic Route Encapsulation (GRE), or another tunneling protocol. Intermediate network 12 may alternatively be referred to as an "MPLS/IP core network."

In the example of FIG. 1, intermediate network 12 and Ethernet segments 14A-14B ("Ethernet segments 14" or "port-extender Ethernet segments 14") represent a data center L2/L3 switching fabric (or "data center fabric network") that interconnects CEs for tenants of the data center, where a tenant may represent an organization or a logical partitioning of resources, data, and/or applications within the data center. Although not illustrated, EVPN network 12 may be coupled to one or more networks administered by other providers, and may thus form part of a large-scale public network infrastructure, e.g., the Internet. EVPN network 12 may provide computing devices within customer networks 6 with access to the Internet, and may allow the computing devices within the customer networks to communicate with each other.

Intermediate network 12 may include a variety of network devices other than PEs 10. For instance, intermediate network 12 may include a route reflector (RR) 21 (depicted in dashed lines to denote that RR 21 is optional) having routing protocol sessions with each of PEs 10, one or more provider routers (also known as "P" or "core" routers), switches, and so forth. In some examples, the route reflector 21 may reside within intermediate network 12 and along a path in intermediate network 12 between two or more PEs. In some cases, any one or more of PEs 10 or separate core routers (not shown) of intermediate network 12 and coupled to PEs 10 may have one or more wide area network (WAN) interfaces to PE devices external to a data center that includes intermediate network 12.

Although not shown for ease of illustration/explanation purposes, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider intermediate network 12 includes L2 EVPN service. Intermediate network 12 may represent an L2/L3 switch fabric for one or more data centers that may provide a form of L2 connectivity across an intermediate L3 network, such as intermediate network 12, to interconnect two or more network devices of L2 customer networks, such as L2 customer networks 6, that may be located in different racks in the case of a data center implementation. Often, EVPN is transparent to the customer networks in that these customer networks are not aware of the intervening intermediate network and instead act and operate as if these customer networks were directly connected and formed a single L2 network. In a way, EVPN enables a form of a transparent local area network (LAN) connection between two customer sites that each operates a L2 network and, for this reason, EVPN may also be referred to as a "transparent LAN service."

To configure an EVPN, a network operator of the intermediate network 12 configures, via configuration or management interfaces, various devices included within intermediate network 12 that interface with L2 customer networks 6. The EVPN configuration may include an EVPN instance (EVI), which includes one or more broadcast domains, such as virtual local area networks (VLANs) of customer networks 6. Generally, an EVI may be associated with a virtual routing and forwarding instance (VRF) on a PE device, such as any of PE devices 10A-10D, for storing EVPN routes exchanged via Border Gateway Protocol (BGP) for the EVI. Multiple EVIs may be configured on PE devices 10 for Ethernet segments 14A-14B, as further described herein, each providing a separate, logical layer two (L2) forwarding domain. Ethernet Tags may be used to identify a particular broadcast domain, e.g., a virtual LAN (VLAN), for an EVI.

Ethernet segments 14 may each be assigned a unique identifier, referred to as an Ethernet Segment Identifier (ESI). As described in further detail below, because each of Ethernet segments 14 is multi-homed to multiple PEs 10, the respective ESIs for Ethernet segments 14 are non-zero and unique within system 2.

In some examples, system 2 may include virtual extensible LAN (VXLAN) overlay networks operating over one or more underlay layer 3 networks connecting PEs 10 to CEs 8. In such examples, each of Ethernet segments 14 may represent a VXLAN overlay network with a different VXLAN network identifier (VNI).

In the illustrated example, an EVPN instance (EVI) 3 is configured within EVPN network 12 for customer networks 6 to enable endpoints 4 within customer networks 6 to communicate with one another via the EVI as if endpoints 4 were directly connected via an L2 network. As used herein, an EVI may represent an EVPN routing and forwarding instance spanning PE devices 10A-10D configured with the EVI 3. Each of PEs 10 is configured with EVI 3 and exchanges EVPN routes to implement EVI 3.

As shown in the example of FIG. 1, intermediate network 12 may provide an MPLS core or IP tunneling infrastructure for sending packets among customer networks 6A-6D. Each of PE devices 10A-10D implement the MPLS protocol and apply one or more MPLS labels, i.e., a label stack, to packets in accordance with routing and forwarding information configured at each respective PE device. In an EVPN, a label stack applied to a packet may include multiple labels.

System 2 may include one or more port-extender devices 11A, 11B ("port-extenders 11") that provide additional ports for a network device to which it is connected. For example, PEs 10 may be connected to port-extender 11A to form a single logical switch, referred to as an "Extended Switch," to forward traffic on corresponding ports connected to CE routers 8A, 8B, respectively. That is, port-extenders 11 may combine distributed network components into a single Extended Switch.

As shown in FIG. 1, each of CEs 8 (and each of Ethernet segments 14) is connected to respective port-extenders 11, which are multi-homed to multiple PEs 10. In EVPN, a CE is typically multi-homed when it can access intermediate network 12 via two or more separate PE devices on the same EVI when the multi-homing PE devices have interfaces with the same Ethernet segment. In instances where a given customer network (such as customer network 6A) may couple to EVPN network 12 via two different and, to a certain extent, redundant links, the customer network may be referred to as being "multi-homed."

When EVPN is used in a port-extender fabric, CEs 8 are behind the extended-ports of port-extenders 11. That is, by having CEs 8 behind the extended-ports of port-extenders 11, CEs 8 may be multi-homed to PEs 10 via the port-extenders 11. For example, port-extender 11A may be multi-homed to PEs 10A-10D because port-extender 11A is coupled to EVPN network 12 via two different and, to a certain extent, redundant links 15A-15D, respectively, of Ethernet segment 14A where PE devices 10A-10D are each capable of providing the EVPN service for L2 customer networks 6A, 6B via port-extender 11A and CEs 8A, 8B. Likewise, port-extender 11B is multi-homed to PE devices 10A-10D via multi-homed Ethernet segment 14B having Ethernet links 16A-16D, respectively, of Ethernet segment 14B where PE devices 10A-10D are each capable of providing the EVPN service for L2 customer networks 6C, 6D via port-extender 11B and CEs 8C, 8D. In other words, CEs 8 are in a sense multi-homed to PEs 10 when using EVPN inside a port-extender fabric. One or more Ethernet tags may be configured on each of Ethernet segments 14. Multi-homed networks are often employed by network operators so as to improve access to EVPN provided by intermediate network 12 should a failure in one of Ethernet links 15, 16 occur.

PEs 10 may be configured to operate in active-active redundancy mode with respect to Ethernet segments 14, whereby all PEs 10 connected to a given Ethernet segment 14 are operable to forward traffic to and from the Ethernet segment. Each of Ethernet segments 14 may act as a link aggregation group to the port-extenders 11 connected to the Ethernet segment.

PEs 10 participate in designated forwarder (DF) election for each connected Ethernet segment. PEs 10 may implement DF election using RFC 7432, Section 8.5. For example, PEs 10 that participate in any of Ethernet segments 14A-14B output EVPN Ethernet Segment (Type 4) routes advertising ESIs, and PEs 10 may participate in DF elections to determine the DFs on a per-broadcast domain, per Ethernet segment basis based on the EVPN Ethernet Segment routes for all of PEs 10.

In general, a designated forwarder PE of the PEs 10 is responsible for sending traffic for a broadcast domain (e.g., VLAN) for an Ethernet segment 14. That is, a designated forwarder PE of PEs 10 for an ES 14 is responsible for sending traffic on a given Ethernet Tag on a particular Ethernet segment to the CE router. In the illustrated example, PE 10A is a designated forwarder for Ethernet segment 14A for at least one broadcast domain.

Using ESIs, PEs 10 may share learned MAC addresses by sending MAC advertisement routes that specify, among other information, a learned MAC address and a corresponding ESI and Ethernet Tag ID. In this way, PE devices may maintain tables of MAC addresses associated with corresponding ESIs and Ethernet Tag IDs. Consequently, a PE device that receives and stores MAC addresses that were previously learned by other PE devices can determine that a MAC address is accessible through multiple PE devices that provide reachability to the same ESI.

PEs 10 use control plane signaling with different route types (herein referred to as "EVPN routes") to implement the EVPN service in EVPN network 12. EVPN defines BGP Network Layer Reachability Information (NLRI), and in particular, defines different route types. The EVPN NLRI is carried in BGP using BGP Multiprotocol Extensions. EVPN route types include but are not limited to Ethernet Auto-Discovery (AD) per Ethernet segment routes (Type 1), MAC advertisement routes (Type 2), Ethernet Segment routes (Type 4), and BGP join synch routes (Type 7).

PE devices 10A-10D may advertise Ethernet AD routes (Type 1) specifying the relevant ESI for the Ethernet segment for the EVI. That is, each of PEs 10 may advertise an Ethernet AD route per Ethernet segment to advertise reachability of the PE device for the Ethernet segment. An Ethernet AD route advertised by each of PE devices 10A-10D specifies a Route Distinguisher (RD) (which may include, e.g., an Internet Protocol (IP) address of the originating PE), ESI, Ethernet Tag Identifier, and MPLS label, for example. Per RFC 7432, the Ethernet AD route advertisement may also include an ESI Label extended community attribute to enable split-horizon procedures for multi-homed sites. Because each of Ethernet segments 14 is multi-homed to multiple PEs 10, the respective ESIs for Ethernet segments 14 are non-zero and unique within system 2.

Each of PEs 10 may advertise MAC advertisement routes (Type 2) to describe a MAC address state. That is, each of PEs 10 may exchange MAC advertisement routes describing the reachability of MAC addresses for an Ethernet segment that was learned by the PE device. A MAC advertisement route advertised by each of PE devices 10A-10D specifies a RD, ESI, Ethernet Tag Identifier, MAC address of a host device (and/or IP address of the host device), and MPLS label, for example.

To enable PEs 10 connected to the same Ethernet segment 14 to automatically discover one another and for purposes of Designated Forwarder election per ES, each PE of PEs 10 advertises an Ethernet Segment route (Type 4) for each of the Ethernet segments multi-homed by the PE. For example, PE 10A advertises an Ethernet Segment route for each of Ethernet segments 14A and 14B. An Ethernet Segment route specifies a Route Distinguisher, Ethernet Segment Identifier, and an originating router's IP address, for example.

In some examples, PE devices 10A-10D may advertise a Type 7 BGP route to describe a multicast state. A Type-7 BGP route, also referred to herein as a "BGP join synch route," is used for coordinating or synchronizing a multicast join request amongst PE devices of an Ethernet segment. In other words, an EVPN may use a Type-7 route to coordinate the IGMP Join (x,G) state for a given EVI between each of the PE devices attached to a given ES when operating in either single or all-active redundancy mode. The Type-7 route indicates that a PE device has received an IGMP join request to join a multicast group on the Ethernet segment. When one of the PE devices receives an IGMP join report on an Ethernet segment from a CE router, it sends out a BGP Type-7 route with the ESI value. Each additional multi-homed PE device on the Ethernet segment imports the Type-7 route and, based on the Type-7 route, synchronizes its IGMP state.

In the example of FIG. 1, when providing the EVPN service to customer networks 6, PEs 10 and CEs 8 typically perform MAC address learning to forward L2 network communications in system 2. That is, as PEs 10 and CEs 8 forward Ethernet frames, the routers learn L2 state information for the L2 network, including MAC addressing information for endpoints 4 within the network and the physical ports through which endpoints 4 are reachable. PEs 10 and CEs 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

In contrast, in a port-extender fabric, port-extenders 11 do not perform MAC address learning, and instead may demultiplex traffic based on a port or channel identifier, referred to as an E-Channel Identifier (ECID) included in an 802.1BR header, for example. The ECID is an identifier for a logical channel between an extended-port of the port-extender device and a corresponding virtual interface of a PE device. The 802.1BR header is based on the 802.1BR Bridge Port Extension standard that provides protocols to extend a bridge and management of the bridge's objects. For example, a "controlling device," such any of PEs 10 may control the forwarding of traffic to port-extenders 11 based on the 802.1BR protocol. In one example, PEs 10 may forward a packet including the 802.1BR header such that when a port-extender 11 receives the packet including the 802.1BR header, the port-extender may determine the port or channel identifier from the 802.1BR header and may demultiplex the traffic and forward the traffic to the corresponding port. That is, in a port-extender fabric, port-extenders 11 do not have knowledge of MAC addressing information for endpoints 4 within the network and the physical ports through which endpoints 4 are reachable. More information concerning 802.1BR can be found in an IEEE publication entitled "IEEE Standard for Local and metropolitan area networks—Virtual Bridged Local Area Networks—Bridge Port Extension," dated Jul. 16, 2012, which is hereby incorporated by reference as if fully set forth herein.

However, the implementation of port-extenders in EVPN leads to several inefficiencies. For example, each ESI is mapped to each extended-port behind port-extenders 11, which leads to a large number of Ethernet segment signaling. Although port-extenders 11 are each illustrated with two ports for ease of illustration, if each of port-extenders 11 include a large number of ports, e.g., 10,000 ports, each of the 10,000 ports is mapped with each of Ethernet segments 14. As noted above, each of PEs 10 would typically advertise various EVPN routes, e.g., Type 1, Type 4, to advertise the Ethernet segment to each other. In the above example, each of PEs 10 would therefore advertise 40,000 Ethernet A-D per ES routes, 40,000 Ethernet segment routes, 40,000 Ethernet A-D per EVI routes for Ethernet segment 14A, resulting in a large BGP table size. In some examples, a large port-extender fabric leads to a large number of designated forwarder elections. If link failure occurs, DF convergence is long because DF election is too granular, i.e., different extender-ports on the same port-extender have different DFs. In some examples in which split-horizon is used in a large port-extender fabric, a large number of MPLS ESI labels is used.

In accordance with techniques of this disclosure, each of PEs 10 may define procedures to model a port-extender device and the set of links connecting PEs 10 to the port-extender device, as an Ethernet segment. To model a port-extender device as an Ethernet segment, each of PEs 10 may advertise EVPN routes that reference an ESI with port granularity information in addition to MAC addressing information (or multicast state information) such that a receiving PE may include the port granularity information in a packet to be forwarded to the port-extender.

For example, PEs 10 may include a BGP extended community to include information of one or more extended-ports behind a port-extender 11 of a particular Ethernet segment 14 (referred to herein as "port granularity information"). In one example, PEs 10 may advertise MAC advertisement routes (Type 2) including extended-port information in addition to MAC addressing information. For example, PE 10B may typically advertise MAC advertisement routes 18A-18C (collectively, "MAC advertisement routes 18") to PEs 10A, 10C, and 10D, respectively, to advertise MAC address reachability. In this example, the MAC advertisement routes 18 may be extended to include information identifying an extended-port behind port-extender 11A for Ethernet segment 14A. The port granularity information may include an ECID that identifies a logical channel between the extended-port of port-extender 11A and a corresponding virtual interface of PE 10B for which the MAC address was learned. That is, in addition to advertising information about which Ethernet segment the MAC address was learned, PEs 10 also advertise information on the extended-port of a port-extender from which the MAC address was learned.

In another example, PEs 10 may advertise BGP join synch routes (Type 7). For example, PE 10B may advertise BGP join synch routes 20A-20C (collectively, "BGP join synch routes 20") to PEs 10A, 10C, and 10D, respectively, to advertise multicast state information. In this example, BGP join synch routes 20 may be extended to include port granularity information (as described above) for port-extender 11A for Ethernet segment 14A. That is, in addition to advertising information about which Ethernet segment the multicast state was learned, PEs 10 also advertise information on the extended-port of a port-extender from which the multicast state was learned.

Each of the receiving PEs (e.g., PEs 10A, 10C, and 10D) may receive the MAC advertisement routes 18 or BGP join synch routes 20 and may store the port granularity information in a BGP table, e.g., MAC table for Type 2 routes, IGMP snooping table for Type 7 routes. PEs 10A, 10C, and 10D may each configure an 802.1BR header 24 to include the port granularity information, e.g., the ECID received from either MAC advertisement routes 18 or BGP join synch routes 20. For example, PE 10A may include port granularity information in 802.1BR header 24 of packet 22 destined for endpoint 4A. That is, port-extender 11A may receive an 802.1BR header 24 from PE 10A, which includes the ECID, for which port-extender 11A may demultiplex packet 22 and forward the traffic to a corresponding port to CE 8A, for example.

By advertising port granularity information, the number of Ethernet segment advertisements may be reduced. For example, rather than advertising EVPN routes (e.g., Type 1 and Type 4) for each mapping between an Ethernet segment and extended-port, PEs 10 may instead advertise MAC advertisement routes or BGP join synch routes with a BGP extended community that includes port granularity information. In this way, receiving PEs 10 may receive fewer EVPN routes that results in a reduced BGP table size.

Moreover, by advertising EVPN Ethernet Segment routes (Type 4) at the granularity of port-extender devices, the number of DF elections may be reduced. In this way, a DF may be elected for a given port-extender device rather than a particular port, resulting in a reduced number of DF elections, and faster traffic convergence following multi-homing changes.

Figure 2:
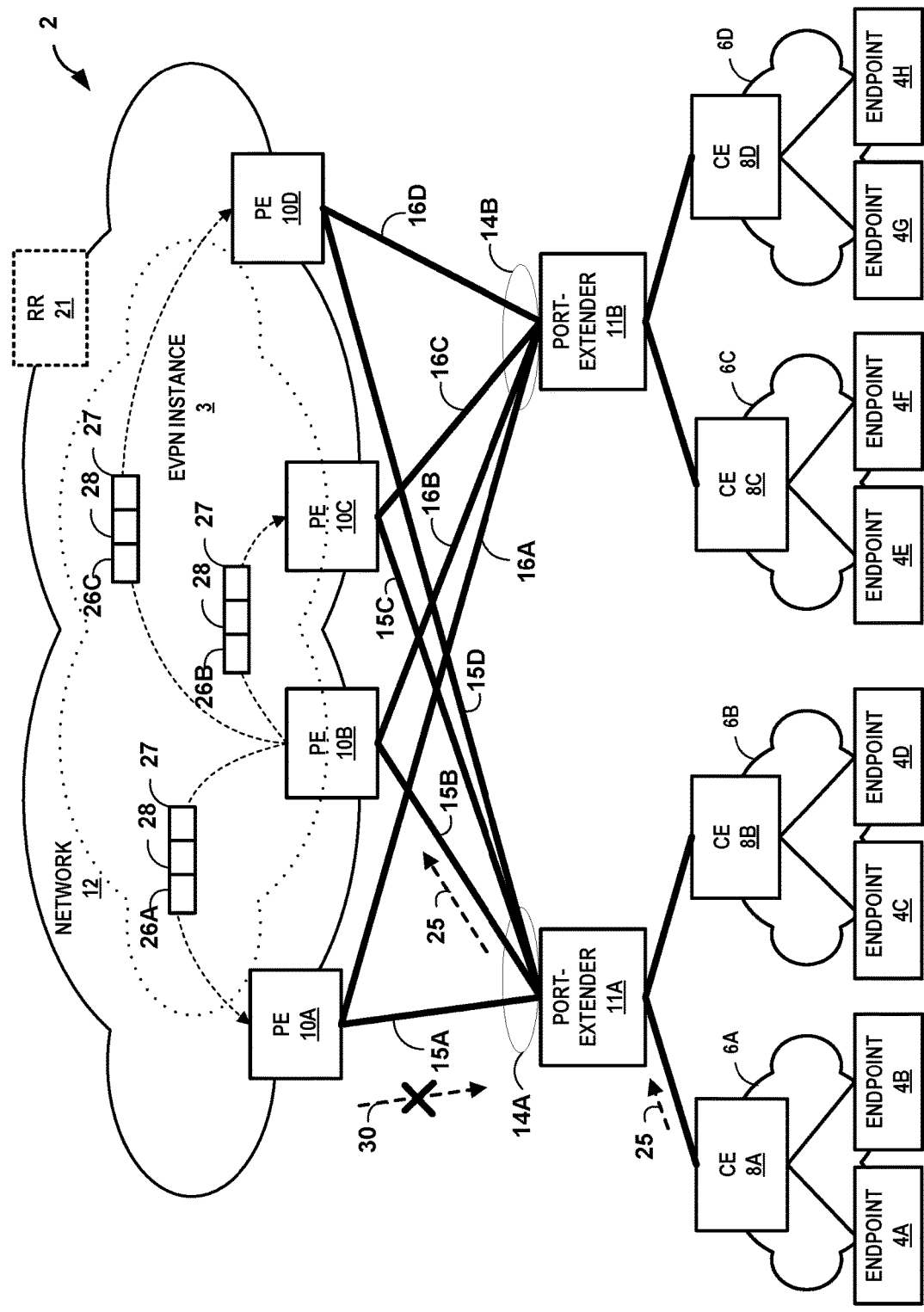
FIG. 2 is a block diagram illustrating the system of FIG. 1 that implements split-horizon, according to techniques described in this disclosure.

FIG. 2 is a block diagram illustrating the system 2 of FIG. 1 implementing split-horizon, in accordance with the techniques described in this disclosure. As described above, each of PEs 10 may typically advertise Ethernet AD routes (Type 1) with an ESI Label Extended Community to enable split-horizon procedures for multi-homed sites. Typically, an ESI label corresponding to an Ethernet segment of the advertising PE device indicates, to a PE device that receives a packet via intermediate network 12 with the ESI label, that the receiving PE device is to perform split-horizon of the packet to drop the packet instead of forwarding the packet to the Ethernet segment corresponding to the ESI label that originated the packet. In the example of FIG. 2, the ESI label (herein referred to as "port-extender ESI label 27") may represent Ethernet segment 14A of the advertising PE device, e.g., PE 10B, that is used in split-horizon by PE devices (e.g., PEs 10A, 10C, and 10D) connected to the same multi-homed Ethernet segment 14A to a port-extender device 11A.

In accordance with the techniques of this disclosure, to perform split-horizon, PEs 10 may, in addition to advertising the port-extender ESI label 27, include in a packet an 802.1BR header 28. For example, packet 25 from port-extender 11A may include an 802.1BR header. PE 10B may construct packets 26A-26C (collectively, "packets 26") to be replicated to other PEs in intermediate network 12. For example, PE 10B may construct packets 26 to include the 802.1BR header from packet 25 as an 802.1BR header 28 in packet 26. As described in FIG. 1, the 802.1BR header may include an ECID corresponding to the ingress extended-port behind port-extender 11A. In this way, PE 10B may preserve the ECID value that is local to port-extender 11A such that a receiving PE device, e.g., PE 10A, may receive a packet 26A via intermediate network 12 with the port-extender ESI label 27 and the 802.1BR header 28. In some examples, port-extender ESI label 27 may be allocated following EVPN MPLS procedures, i.e., a downstream allocated label (allocated by each receiving PE connected to the port-extender ES) in the case of MPLS ingress replication, or an upstream allocated label (allocated by the source PE) in the case of P2MP MPLS. That is, if MPLS ingress replication is implemented, then port-extender ESI label 27 may include different values, whereas if P2MP MPLS is implemented, then port-extender ESI label 27 may have the same value.

The port-extender ESI label 27 and the 802.1BR header 28 provide receiving PE devices 10A, 10C, and 10D, extended-port information for which the receiving PE devices may perform split-horizon of the packet to drop the packet instead of forwarding the packet to the extended-port behind port-extender 11A corresponding to Ethernet segment 14A that originated the packet. For example, PE 10A may receive packet 26A including port-extender ESI label 27 and 802.1BR header 28. Port-extender ESI label 27 indicates to PE 10A to perform split-horizon of packet 26A. 802.1BR header 28 indicates to PE 10A the ingress extended-port for which port-extender 11A received packet 25. PE 10A may determine from port-extender ESI label 27 and 802.1BR header 28 to drop packet 30 instead of forwarding packet 30 to the extended-port behind port-extender 11A corresponding to Ethernet segment 14A.

In some examples, PEs 10 may perform split-horizon by comparing the source MAC address received locally or from a BGP extended community and a source MAC address received from traffic forwarded from port-extender 11A. For example, receiving PE device 10A may receive a BGP extended community included with a MAC advertisement route (Type 2) (route 18 of FIG. 1) from PE device 10B. The receiving PE device, e.g., PE 10A, may determine from the BGP extended community a first source MAC address. The receiving PE device may compare the first source MAC address included in the MAC advertisement route with a second source MAC address included in a packet that was forwarded to the receiving PE device over EVPN network 12. The receiving PE device may compare the source MAC addresses, and if the source MAC addresses are the same, the receiving PE device may perform split-horizon to drop the packet. Correct split-horizon may be delayed until the Type 2 route containing the source MAC address is advertised and received on all PEs, or during MAC move transitions.

In this way, by advertising port granularity information, only one MPLS ESI label per port-extender device is needed for split-horizon, which results in fewer MPLS ESI labels needed for split-horizon in an EVPN with port-extenders.

Figure 3:
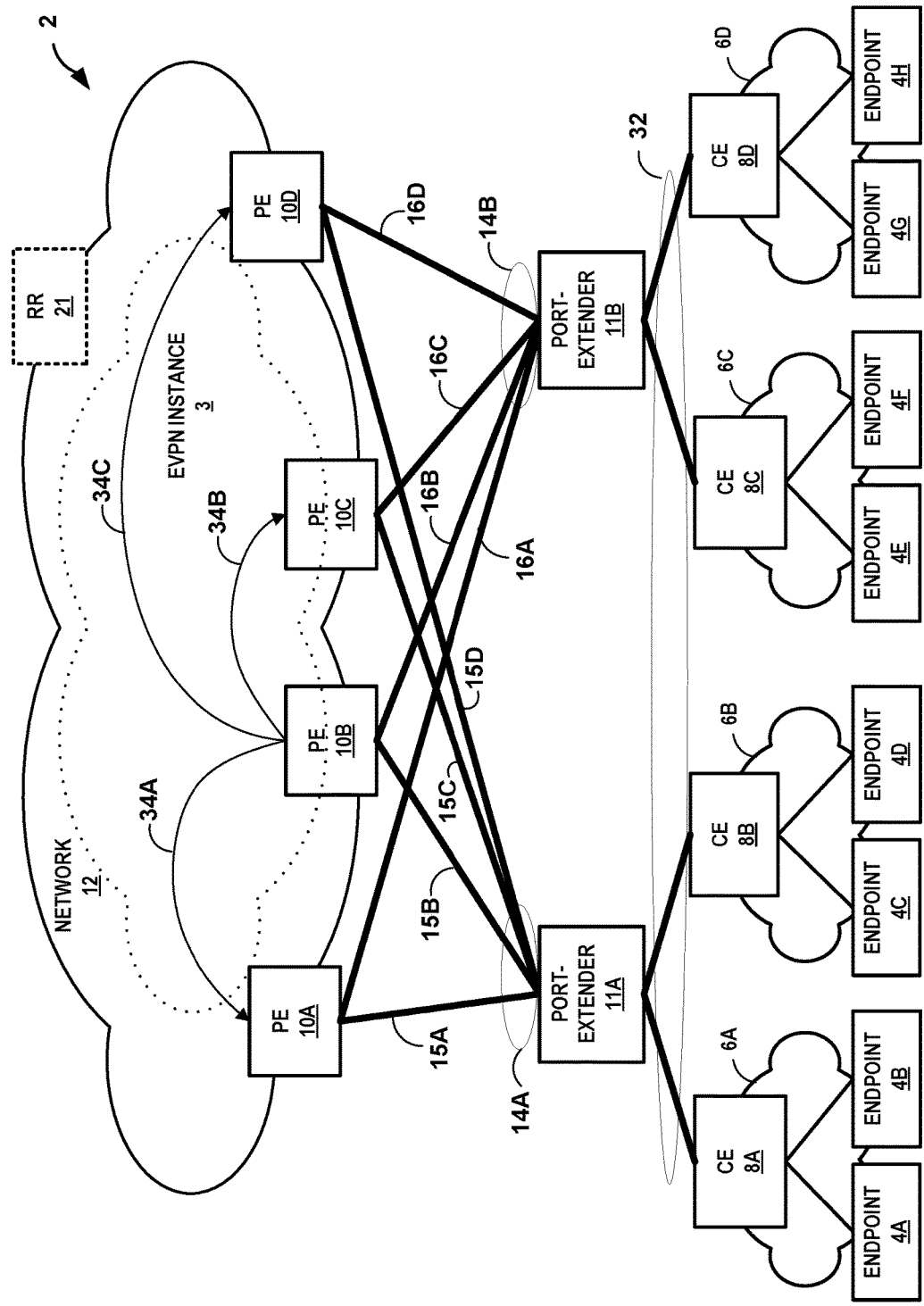
FIG. 3 is a block diagram illustrating the system of FIG. 1 that implements Link Aggregate Group (LAG) of a plurality of port-extenders, in accordance with the techniques of this disclosure.

FIG. 3 is a block diagram illustrating the system 2 of FIG. 1 implementing a Link Aggregation Group (LAG) 32, in accordance with the techniques described herein. In the example of FIG. 3, a plurality of port-extenders may be grouped together. For example, multiple extended ports behind port-extenders 11 may be grouped to form LAG 32. Extended-port Link Aggregation Groups may share the same Aggregated Ethernet segment (e.g., Ethernet segments 14A, 14B). That is, extended-port LAGs (e.g., LAG 32) behind port-extenders 11A and 11B may be mapped to the Aggregated Ethernet segment.

Typically, when a link between one of PEs 10 and port-extender 11A fails, the corresponding Ethernet segment is withdrawn due to unreachability of port-extender 11A. In contrast, a group of port-extenders may reduce the withdrawal of the Ethernet segment in the event of a link failure.

In accordance with the techniques described herein, Ethernet segments of a port-extender group may be withdrawn only when all links of a port-extender group are down. To configure LAG 32 for a plurality of port-extenders 11, a global ECID may be defined to associate with the LAG behind the group of port-extenders 11. That is, the global ECID may identify a group of logical channels between extended-ports of a plurality of port-extender devices 11 and a corresponding virtual interface of PEs 10.

Each of PEs 10 may advertise the global ECID by including the global ECID in a BGP extended community as previously described in FIG. 1. For example, PEs 10 may advertise a MAC advertisement route (Type 2) or a BGP join synch route (Type 7), e.g., EVPN routes 34A-34C, including the global ECID. PEs 10 may also configure an 802.1BR header to include the global ECID when forwarding the packet towards port-extenders 11. In this way, each of PEs 10 that receive the global ECID may implement LAG 32. In this way, the implementation of LAG 32 may reduce the need to withdraw any of Ethernet segments 14 upon failure to one of the links between PEs 10 and port-extenders 11.

Figure 4:
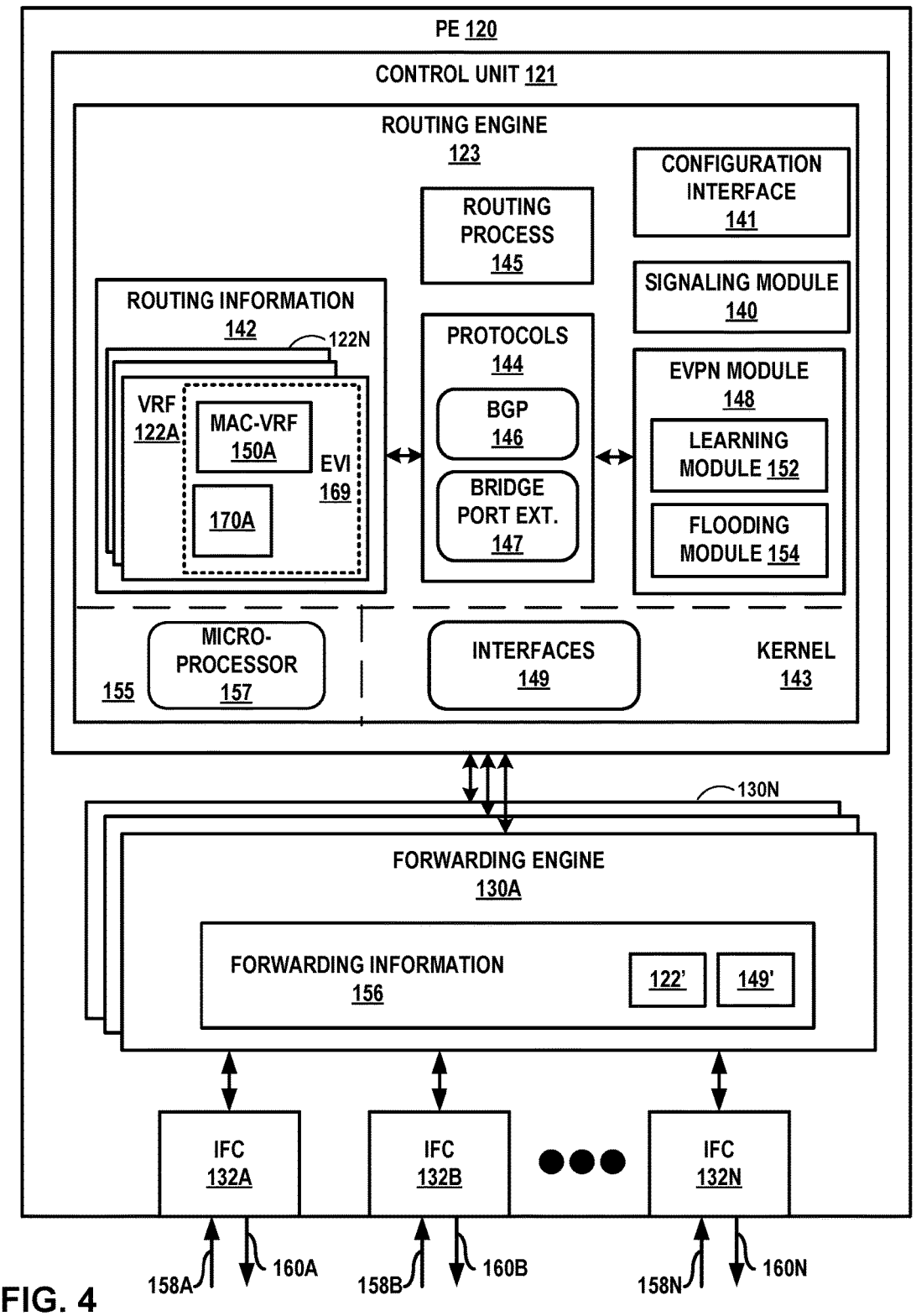
FIG. 4 is a block diagram illustrating further details of a network device, in accordance with techniques of the disclosure.

FIG. 4 is a block diagram illustrating further details of a network device in an EVPN with port-extenders, in accordance with techniques of the disclosure. PE 120 may represent an example instance of any of PE devices 10 of FIGS. 1-3.

PE 120 includes a control unit 121 that includes a routing engine 123, and control unit 121 is coupled to forwarding engines 130A-130N ("forwarding engines 130" or "forwarding units 130"). Each of forwarding engines 130 is associated with one or more of interface cards 132A-132N ("IFCs 132") that receive packets via inbound links 158A-158N ("inbound links 158") and send packets via outbound links 160A-160N ("outbound links 160"). IFCs 132 are typically coupled to links 158, 160 via a number of interface ports (not shown). Interfaces for inbound links 158 and outbound links 160 may represent physical interfaces, logical interfaces, or some combination thereof. Interfaces for links 158, 160 may represent local interfaces of PE 120 for Ethernet links for one or more Ethernet segments of a network.

Elements of control unit 121 and forwarding engines 130 may be implemented solely in software, or hardware, or may be implemented as combinations of software, hardware, or firmware. For example, control unit 121 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 121 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE 120, e.g., protocols. Control unit 121, in some examples, retrieves and executes the instructions from memory for these aspects.

Routing engine 123 includes kernel 143, which provides a run-time operating environment for user-level processes. Kernel 143 may represent, for example, a UNIX operating system derivative such as Linux or Berkeley Software Distribution (BSD). Kernel 143 offers libraries and drivers by which user-level processes may interact with the underlying system. Hardware environment 155 of routing engine 123 includes microprocessor 157 that executes program instructions loaded into a main memory (not shown in FIG. 4) from a storage device (also not shown in FIG. 4) in order to execute the software stack, including both kernel 143 and processes executing on the operating environment provided by kernel 143. Microprocessor 157 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 143 provides an operating environment for a routing process 145 that executes various protocols 144 at different layers of a network stack, including protocols for implementing Ethernet Virtual Private Networks. For example, routing engine 123 includes network protocols that operate at a network layer of the network stack. In the example of FIG. 4, network protocols include the Border Gateway Protocol (BGP) 146, which is a routing protocol. BGP 146 may include Multiprotocol BGP (MP-BGP). Protocols 144 may include a Bridge Port Extension based on IEEE 802.1BR to specify protocols and procedures for operation with port-extenders. Routing engine 123 may also include other protocols, such as an MPLS label distribution protocol and/or other MPLS protocols not shown in FIG. 4. Routing engine 123 is responsible for the maintenance of routing information 142 to reflect the current topology of a network and other network entities to which PE 120 is connected. In particular, routing protocols periodically update routing information 142 to accurately reflect the topology of the network and other entities based on routing protocol messages received by PE 120.

Kernel 143 includes an interfaces table 149 ("interfaces 149") that represents a data structure that includes a corresponding entry for each logical interface configured for PE 120. Logical interfaces may correspond to local interfaces of PE 120 for Ethernet segments 14. Entries for respective logical interfaces may specify respective current information describing the logical interfaces.

As shown in FIG. 4, PE 120 may be configured with multiple VRFs 122A-122N ("VRFs 122"). Each of VRFs 122 represents a virtual routing and forwarding instance. VRF 122A includes at least one routing table for BGP 146, including EVPN routes 170A to store routes in the EVPN address family. MAC-VRF 150A, for instance, may represent a virtual routing and forwarding table of VRFs 122A for an EVI configured for VRF 122A. An attachment circuit may be associated with a particular VRF, such as VRF 122A, and the particular VRF may be configured to forward traffic for the attachment circuit. Routing information 142 may store routes for different routing tables using suitable data structures, such as a set, list, and/or database.

Signaling module 140 outputs control plane messages to automatically establish tunnels to interconnect multiple PE devices including PE 120 and otherwise provision one or more EVIs configured for PE 120 and other PEs. Signaling module 140 may signal the PE routers using one or more suitable tunnel signaling protocols, such as GRE, VXLAN, and/or MPLS protocols. Signaling module 140 can communicate with forwarding engine 130A to automatically update forwarding information 156. In some examples, signaling module 140 may be part of or executed by routing process 145.

Routing engine 123 also includes a configuration interface 141 that receives and may report configuration data for PE 120. Configuration interface 141 may represent a command line interface; a graphical user interface; Simple Network Management Protocol (SNMP), Netconf, or another configuration protocol; or some combination of the above in some examples. Configuration interface 141 receives configuration data configuring the PE 120 with VRFs 122, interfaces 149, EVI 169, and other constructs that at least partially define the operations for PE 120. PE 120 may store configuration data to a storage device (not shown). EVI 169 may represent a local configuration for PE 120 for EVI 3 of FIGS. 1-3.

Routing engine 123 also includes an EVPN module 148 having flooding module 154 that performs flooding and a learning module 152 that performs layer two (L2) learning. Learning module 152 may perform remote learning using BGP 146. EVPN module 148 may maintain MAC-VRFs 150 for each EVI established by PE 120, or in alternative examples may maintain one or more MAC tables and/or IGMP snooping tables that are independent of each respective EVI. Learning module 152 and flooding module 154 may alternatively be configured for execution, in full or in part, by forwarding engine 130A. In some examples, EVPN module 148 may be part of or executed by routing process 145. Learning module 152 may perform MAC/IP binding learning by, e.g., using MAC and IP address information received by PE 120 in Address Resolution Protocol (ARP) or Neighbor Discovery Protocol (NDP) messages.

Learning module 152 may detect a new MAC address on an EVI access interface for an EVI and add the MAC address, with a mapping to the EVI access interface, to MAC-VRF 150A for the EVI. Learning module 152 may then advertise an EVPN MAC advertisement route (or "MAC advertisement route") using BGP 146 to remote PEs. The MAC advertisement route includes a route target corresponding to the EVI, the MAC address, the Ethernet tag for the bridge domain in which the MAC address was learned, the ESI in which the MAC address was learned, the IP address corresponding to the MAC address (if known), and a MAC label. As further described below, the MAC advertisement route may include information on an extended-port behind a port-extender device. With remote MAC learning, learning module 152 may receive an EVPN MAC advertisement route from another PE and install a host route for the IP address (if included) with protocol type EVPN to the appropriate VRF 122 for the EVI and install the MAC address in the MAC-VRF 150 of the EVI (or alternatively a MAC table), MAC information associated with the host route in the VRF 122 including the EVPN label, and the extended-port information.

Forwarding engines 130 represent hardware and logic functions that provide high-speed forwarding of network traffic. Forwarding engines 130 typically includes a set of one or more forwarding chips programmed with forwarding information 156 that maps network destinations with specific next hops and the corresponding output interface ports. In general, when PE 120 receives a packet via one of inbound links 158, one of forwarding engines 130 identifies an associated next hop for the data packet by traversing the programmed forwarding information 156 based on information within the packet. One of forwarding engines 130 (either the ingress forwarding engine or a different, egress forwarding engine) forwards the packet on one of outbound links 160 mapped to the corresponding next hop. Kernel 143 may generate forwarding information 156 to include representation of information stored to VRFs 122 and interfaces 149 in the form of forwarding information 122', 149' for optimized forwarding by forwarding engines 130.

In the example of FIG. 4, forwarding engine 130A includes forwarding information 156. In accordance with routing information 142, forwarding engine 130A stores forwarding information 156 that maps packet field values to next hops and corresponding outbound interface ports 160. For example, routing engine 123 analyzes routing information 142 and generates forwarding information 156 in accordance with routing information 142. Forwarding information 156 may be maintained in the form of one or more tables, link lists, radix trees, databases, flat files, or any other data structures. Routing information 142 includes EVPN routes 170A.

Forwarding engine 130A maintains forwarding information 156 for each EVPN Instance (EVI) established by PE 120 to associate network destinations with specific next hops and the corresponding interface ports. As described in FIG. 1, an EVI may be associated with one or more Ethernet segments. In general, when PE 120 receives a data packet from an Ethernet segment via one of inbound links 158, forwarding engine 130A, for example, identifies an associated next hop for the data packet by traversing forwarding information 156 based on information (e.g., labeling information) within the packet. Forwarding engine 130A forwards the data packet on one of outbound links 160 to the corresponding next hop in accordance with forwarding information 156 associated with the Ethernet segment. At this time, forwarding engine 130A may push and/or pop labels from the packet to forward the packet along a correct LSP.

Forwarding engine 130A receives data packets on inbound links 158 that are destined for one of the PEs in the EVPN. Forwarding engine 130A determines whether the destination customer MAC address of the data packets is included in the one of MAC-VRFs 150 associated with the EVPN. If the MAC address is included in the one of MAC-VRFs 150, then PE 120 forwards the data packets to the destination PE router according to information in the MAC-VRF 150 based on forwarding information 56 associated with the EVPN. If the customer MAC address is not included in the one of MAC-VRFs 150, PE 120 floods the data packets to all of the PE routers based on forwarding information 156 associated with the EVPN. Further example details of remote and local MAC learning for EVPN is described in RFC 7432.

EVPN module 148 additionally manages the EVPN multi-homing mode of operation for PE 120. That is, EVPN module 148 operates to maintain EVPN service and traffic forwarding to and from port-extenders 11 multi-homed to PE 120 and one or more other routers. For example, in the event of a network failure such as a PE 120 to port-extender 11A Ethernet link failure; a failure of PE 120; or an MPLS-reachability or other type of tunneling failure between PE 120 and a remote PE 10; EVPN module 48 coordinates with PEs 10 to ensure that one of PEs 120, 10 is in an active mode. EVPN module 148 may coordinate with other PEs 10 to elect a new designated forwarder for an Ethernet segment 14 for EVI 3.

Routing process 145 may generate EVPN routes and send and receive, via BGP 146 sessions with other PEs and/or one or more route reflectors, EVPN routes. Routing process 145 may store generated EVPN routes and import/store received EVPN routes to a route table storing EVPN routes 170A for EVI 169.

In accordance with the techniques described herein, routing process 145 may generate a BGP extended community for an EVPN route to include information on an extended-port behind a port-extender coupled to PE 120. For example, PE 120 may generate an 802.1BR header including a channel identifier, e.g., ECID, that identifies a logical channel between an extended-port of the port-extender device and the EVI access interface of PE 120. Typically, PE 120 may receive an ECID from a packet that traverses between the port-extender and PE 120. In accordance with the techniques described herein, PE 120 may exchange EVPN routes including the ECID, such that a receiving PE may generate an 802.1BR header to include the ECID to identify the port-granularity information for a port-extender device.

In one example, routing process 145 may generate and advertise at least one MAC advertisement route for EVI 169 that includes the information on the extended-port (e.g., ECID) behind the port-extender coupled to PE 120. For example, routing process 145 may generate a MAC advertisement route to include a BGP extended community with the extended-port information. In some examples, routing process 145 may generate and advertise at least one BGP join synch route for EVI 169 that includes the information on the extended-port (e.g., ECID) behind the port-extender coupled to PE 120. For example, routing process 145 may generate a BGP join synch route to include a BGP extended community with the extended-port information.

In some examples, routing process 145 may include a BGP extended community with extended-port information for a plurality of port-extenders. In this example, routing process 145 may generate and advertise an EVPN route including a global ECID to identify a plurality of logical channels between extended-ports of a plurality of port-extender devices and the EVI access interface of PE 120. By utilizing a global ECID, PE 120 may configure the plurality of port-extender devices as a Link Aggregation Group such that an Ethernet segment is withdrawn only when all links of the Ethernet segment have failed.

Routing process 145 may also receive EVPN routes (e.g., a MAC advertisement route or BGP join synch route) including extended-port information advertised by one or more remote PEs. Routing process 145 may use the port-granularity information with the ESI and may store the port-granularity information to build a next-hop in the MAC table or IGMP snooping table. In one example, routing process 145 may receive a MAC advertisement route for EVI 169 that includes an ESI and an ECID identifying the extended-port behind the port-extender coupled to PE 120. Routing process 145 may install a route and next-hop towards the destination extended port in a MAC address table, for example. In another example, routing process 145 may receive a BGP join synch route for EVI 169 that includes an ESI and an ECID identifying the extended-port behind the port-extender coupled to PE 120, for which there is IGMP membership for a multicast group. Routing process 145 may install a destination next-hop for that port extender, and aggregate the list of extended port next-hops for a given multicast group in an IGMP snooping table, for example.

Routing process 145 may configure, based on the information on the extended-port, a packet including the information on the extended-port to be forwarded toward the port-extender device. For example, routing process 145 may configure a packet to include an 802.1BR header including the extended-port information. In this way, a port-extender device that receives the packet may determine the extended-port information for which it may demultiplex the packet and forward the traffic to a particular port.

In some examples, PE 120 may further program forwarding information 156 to cause forwarding engines 130 to send the traffic for EVI 169 to one or more remote PEs with the 802.1BR header received from the port-extender. For example, PE 120 may push an 802.1BR header including an ingress ECID tag corresponding to the ingress extended-port behind the port-extender in addition to a port-extender ESI label to provide to a receiving PE device the ingress port information for which to perform split-horizon. Including the 802.1BR header label and a Port-Extender ESI label may enable the remote PE to avoid sending the packet to an Ethernet segment that was a source of the traffic. In this way, PEs including PE 120 may perform split-horizon.

Figure 5:
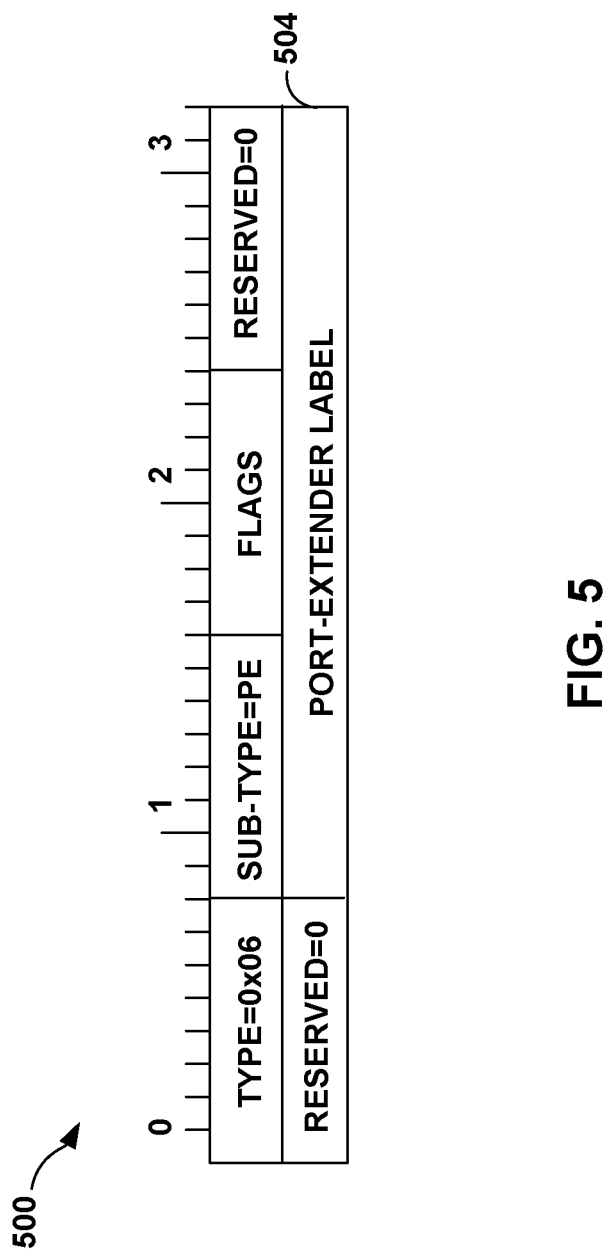
FIG. 5 is a block diagram illustrating an example Border Gateway Protocol community that includes a port-extender label, according to techniques described in this disclosure.

FIG. 5 is a block diagram illustrating an example Border Gateway Protocol community that includes a port-extender label, according to techniques described in this disclosure. Example BGP community 500 (hereinafter, "community 500") may represent a BGP community or a BGP extended community that is included as a path attribute for Network Layer Reachability Information (NLRI) advertised in a Multi-Protocol BGP UPDATE message. MP-BGP and BGP extended communities are described in "Multiprotocol Extensions for BGP-4," IETF Network Working Group, Request for Comments (RFC) 4760, January 2007; and "BGP Extended Communities Attribute", IETF Network Working Group, Request for Comments (RFC) 4360, February, 2006; each of which being incorporated by reference in their entireties.

In some examples, community 500 is extended from the EVPN Extended Community SUB-Types described in "IANA Registries for BGP Extended Communities," RFC 7153, Section 5.2.1, which is incorporated by reference herein in its entirety. Community 500 has Type field value of 0x06 and a Sub-Type field value for a port-extender (0xPE) that may be registered with the Internet Assigned Numbers Authority (IANA) or configurable. The port-extender label may include an identifier, e.g., ECID, for a logical channel between an extended-port of the port-extender device and a corresponding virtual interface of a PE device. That is, the value of Port-Extender Label field 504 is a port-extender label that may carry the ECID for identifying an extended-port behind a port-extender. PE devices in the EVPN instance which receive this port-extender extended community 500, along with a Type-2 or Type-7 route that is connected to the port-extender Ethernet segment, may process the port-extender extended-community. PE devices that are not connected to the port-extender fabric may discard the port-extender extended community based on the Type/Sub-Type.

Figure 6:
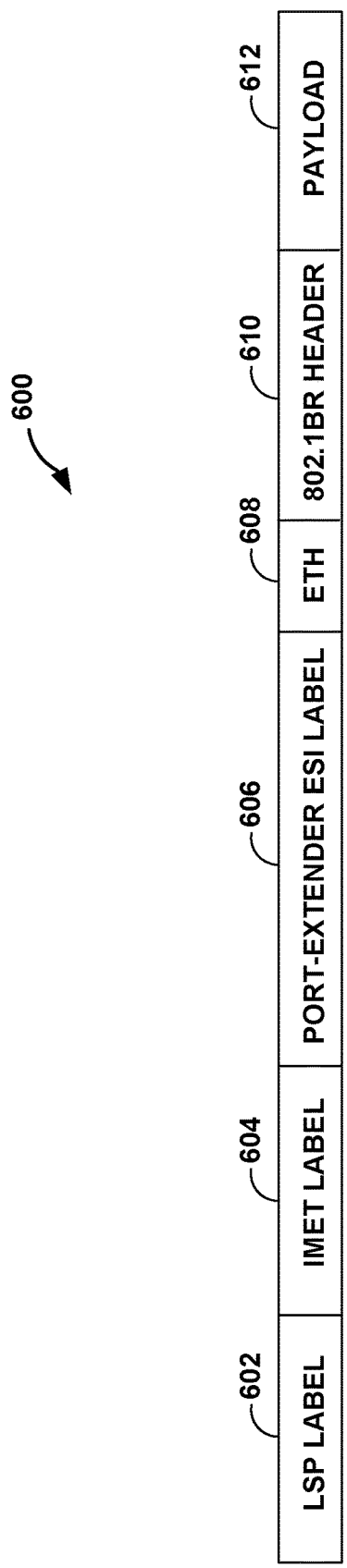
FIG. 6 is a block diagram illustrating an example packet in an EVPN with port-extender devices, according to techniques described in this disclosure.

FIG. 6 is a block diagram illustrating an example packet 600 in an EVPN with port-extender devices, in accordance with the techniques described herein. Packet 600 may include an MPLS packet represented by a "label stack" or sequence of "labels." In the example of FIG. 6, packet 600 may include at least a port-extender ESI label 606 and an 802.1BR header label 610 to perform split-horizon. For illustration purposes, packet 600 may also include an LSP label 602, Inclusive Multicast Ethernet Tag (IMET) label 604, Ethernet Tag 608, and payload 612.

Each of the labels may provide information to forward packet 600 in system 2. For example, LSP label 602 may include a label for indicating a path for which the packet is to travel. Packet 600 may in some examples include an Inclusive Multicast Ethernet Tag (IMET) label 604 for flooding multicast traffic over the EVPN core to all PE devices. Additional information with respect to IMET is described in "BGP MPLS-Based Ethernet VPN," Internet Draft, draft-ietf-12vpn-evpn-11, Oct. 18, 2014, the entire contents of which is incorporated herein by reference. Ethernet Tag 608 may be used to identify the bridge domain in which a MAC address was learned. Payload 612 may include the actual data value.

Port-extender ESI label 606 and the 802.1BR header label 610 may provide PE devices that receive the packet, extended-port information for which the receiving PE device may perform split-horizon of the packet to drop the packet instead of forwarding the packet to the extended-port behind port-extender that originated the packet. For example, port-extender ESI label 606 may include a label indicating, to a PE device that receives the packet, that the receiving PE device is to perform split-horizon of the packet to drop the packet instead of forwarding the packet to the Ethernet segment corresponding to the ESI label that originated the packet. That is, the port-extender ESI label may represent an Ethernet segment of the advertising PE device that is used in split-horizon by PE devices connected to the same multi-homed Ethernet segment. 802.1BR header 610 may include at least an identifier, e.g., ECID, for a logical channel between an ingress extended-port of the port-extender device and a corresponding virtual interface of the advertising PE device.

Figure 7:
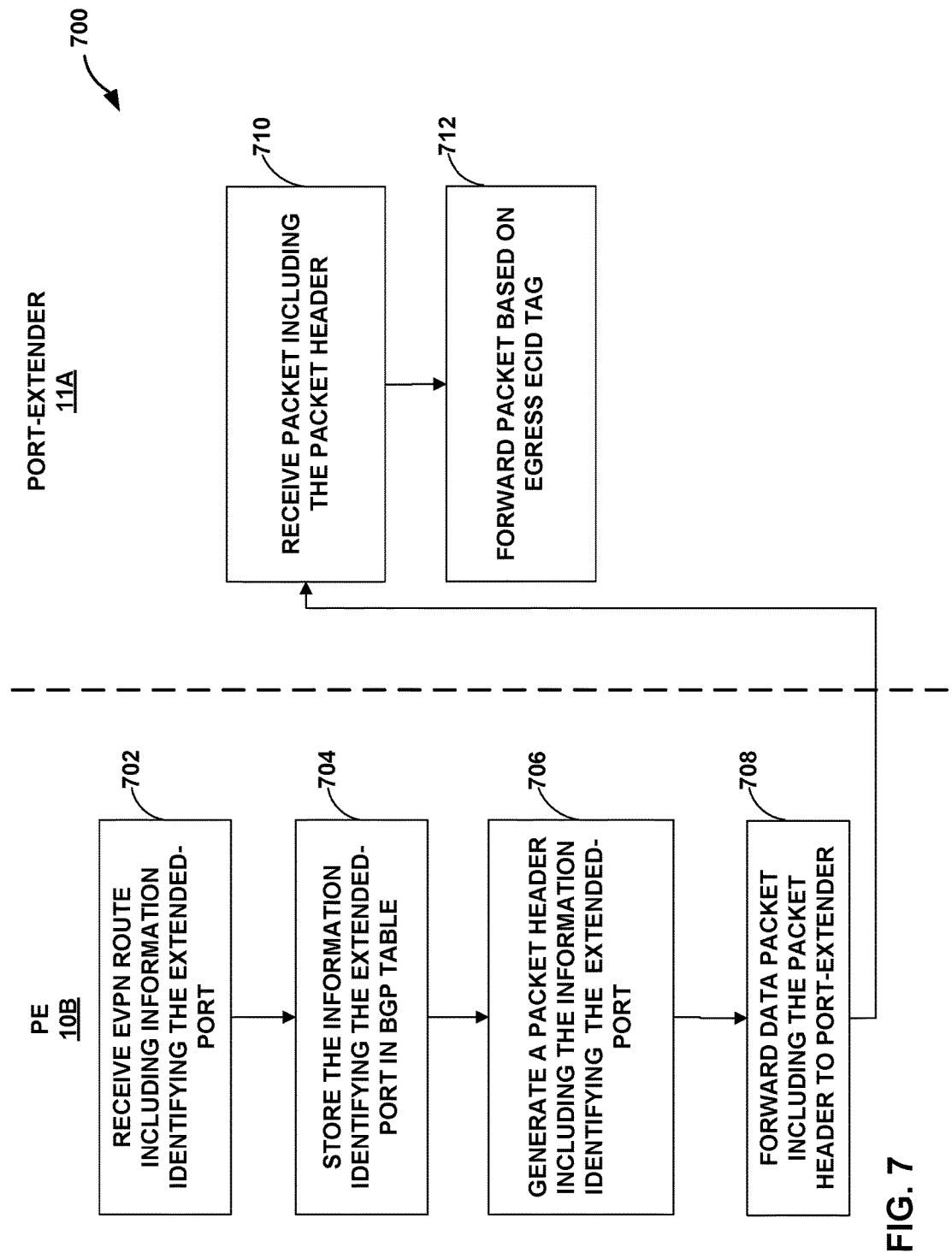
FIG. 7 is a flowchart illustrating an example mode of operation for a provider edge network device in an EVPN with port-extenders, in accordance with techniques of this disclosure.

FIG. 7 is a flowchart illustrating an example mode of operation for a provider edge network device, in accordance with techniques of this disclosure. Operation 700 is described with respect to PE 120 operating as PE 10B of FIG. 1.

Configuration interface 141 of PE 10B may execute NETCONF or other protocol to receive configuration data defining EVPN instance 169 having a routing table 170A to store EVPN routes for the EVPN instance 169. Routing process 145 executes BGP 146 to generate and receive EVPN routes for the EVPN instance 169, which PE 120 stores to routing table 170A. More particularly, routing process 145 generates EVPN routes and receives EVPN routes advertised by one or more remote PE devices (e.g., PEs 10A, 10C, and 10D) also configured with EVPN instance 169, each of the EVPN routes advertising, by one or more of the PEs, at least information on an extended-port behind port-extender device 11A coupled to the Ethernet segment 14A (702).

In one example, routing process 145 generates MAC advertisement routes and receives MAC advertisement routes advertised by one or more remote PE devices also configured with EVPN instance 169, each of the MAC advertisement routes advertising, by one or more of the PEs, a MAC address, an Ethernet segment for the EVPN instance 169, and information on an extended-port behind a port-extender device coupled to the Ethernet segment. In some examples, routing process 145 generates BGP join synch routes and receives BGP join synch routes advertised by one or more remote PE devices also configured with EVPN instance 169, each of the BGP join synch routes advertising, by one or more of the PEs, a multicast state, an Ethernet segment for the EVPN instance 169, and information on an extended-port behind a port-extender device coupled to the Ethernet segment.

As noted above, the extended-port information may include an identifier, e.g., ECID, for a logical channel between an ingress extended-port of a port-extender device and a corresponding virtual interface of the ingress PE device. Routing process 145 may generate and receive an EVPN route including the ECID in a BGP extended community attribute using BGP 146, for example.

PE 10B may store the information identifying the extended-port behind the port-extender device in a BGP table (704), and subsequently in a MAC table or IGMP snooping table. For example, routing process 145 may use the information, e.g., ECID, identifying the extended-port behind the port-extender device to build a next-hop in the MAC table or IGMP snooping table. In one example, routing process 145 may receive a MAC advertisement route (Type 2) that includes an ESI and an ECID identifying the extended-port behind the port-extender coupled to PE 10B. Routing process 145 may install a route and a next-hop towards the destination extended port in a MAC address table, for example. In another example, routing process 145 may receive a BGP join synch route (Type 7) for EVI 169 that includes an ESI and an ECID identifying the extended-port behind the port-extender coupled to PE 10B for which there is IGMP membership for a multicast group. Routing process 145 may install a destination next-hop for that port-extender, and aggregate the list of extended-port next-hops for a given multicast group in an IGMP snooping table, for example.

Based on the received EVPN routes for EVPN instance 169, routing process 145 may communicate the routes and extended-port next-hops to forwarding engine 130A. Forwarding engine 130A may generate a packet header for a data packet including the information identifying the extended-port behind the port-extender device (706). For example, forwarding engine 130A of PE 10B may retrieve the ECID from the extended-port next-hops behind Ethernet segment 14A and may generate an 802.1BR header including the ECID to be forwarded toward the extended-port of port-extender 11A.

PE 10B may forward the data packet with an 802.1BR header toward a port-extender device, e.g., port-extender 11A (708). Port-extender 11A may receive the packet header (710) and may forward the data packet based on the egress ECID tag (712). For example, port-extender 11A may receive the ECID included in the packet header that identifies the logical channel between the ingress extended-port of port-extender device 11A and the corresponding virtual interface of ingress PE device 10B. Port-extender 11A may, based on the ECID, demultiplex the packet and forward the packet to the particular port.

Figure 8A:
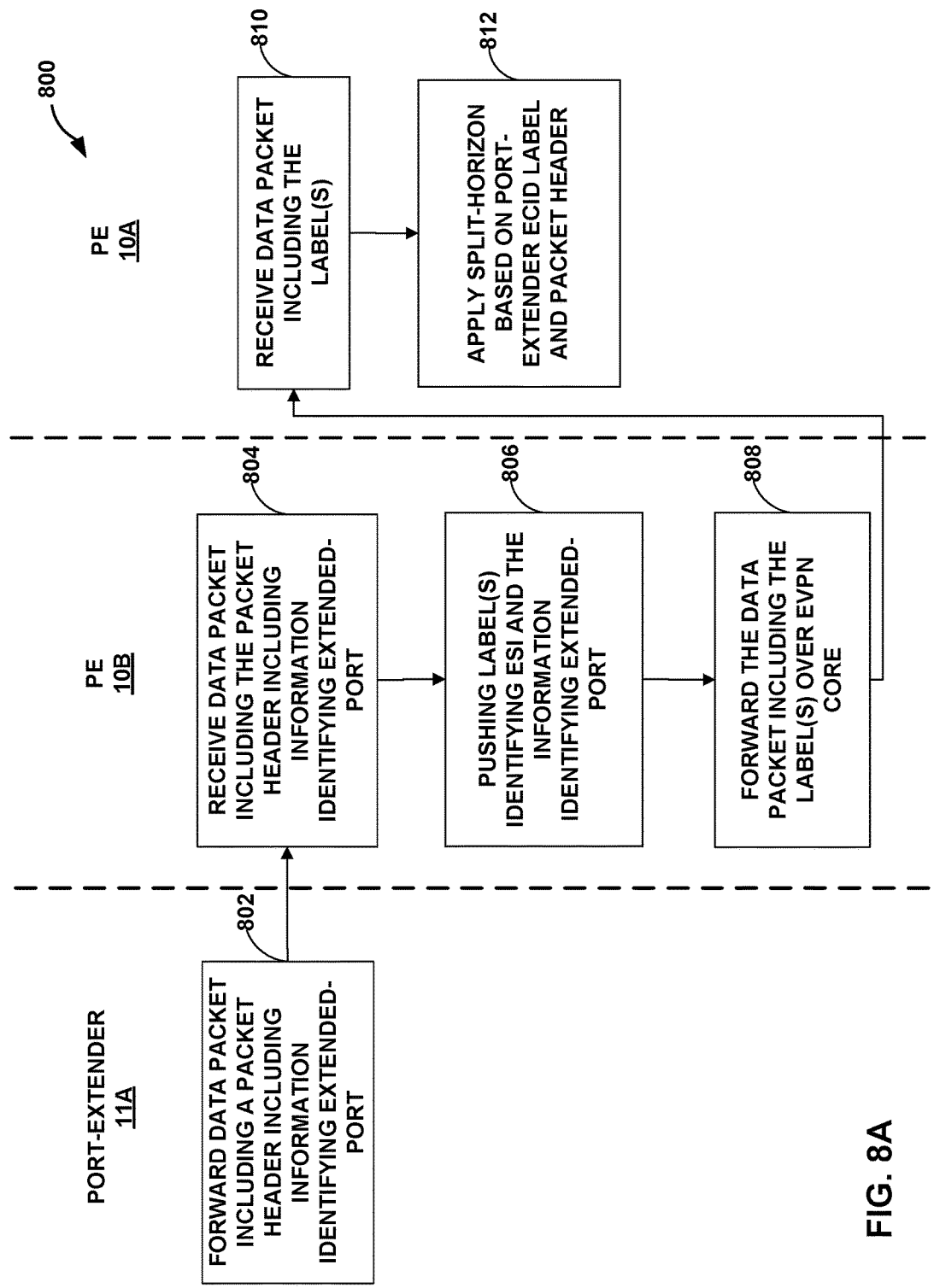
FIGS. 8A-8B are flowcharts illustrating example mode of operations for a provider edge network device to perform split-horizon for an EVPN with port-extenders, in accordance with techniques of this disclosure.
Figure 8B:
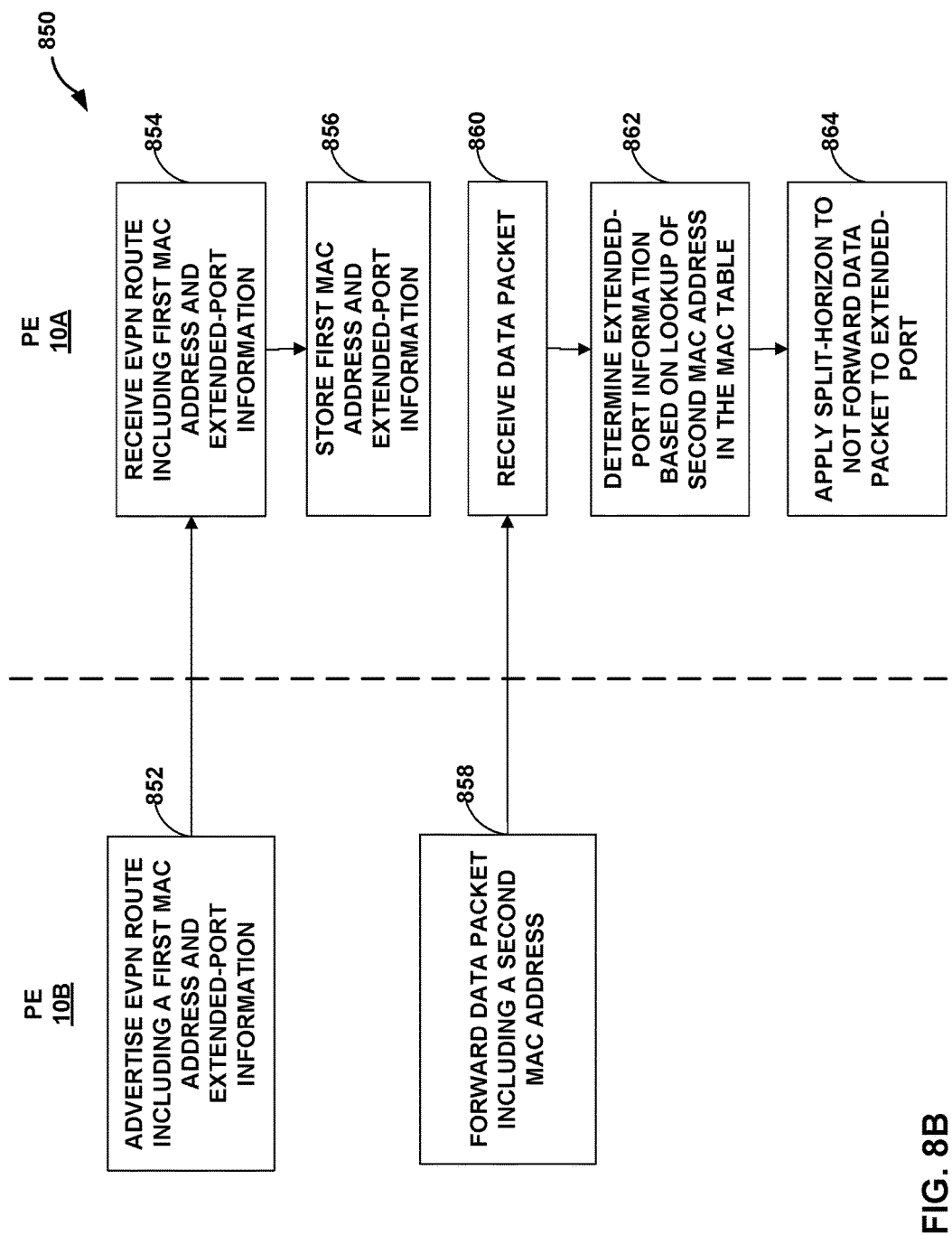

FIGS. 8A-8B are flowcharts illustrating example mode of operations for a provider edge network device to perform split-horizon, in accordance with techniques of this disclosure. Operations 800 and 850 are described with respect to FIGS. 2-4.

In the example of FIG. 8A, port-extender 11A may forward a data packet including a packet header including information identifying an ingress extended-port behind port-extender 11A (802). For example, port-extender 11A may forward a data packet having an 802.1BR header including an ingress ECID tag identifying a logical channel between an ingress extended-port behind port-extender 11A and a virtual interface for PE 10B.

PE 10B may receive the data packet including the packet header via one of inbound links 158 (804). For example, PE 10B may receive a data packet comprising an 802.1BR header including the ingress ECID tag. Routing process 145 may generate a label identifying the Ethernet segment and the information identifying the ingress extended-port behind port-extender 11A and install it in forwarding engine 130A. When forwarding the traffic to a PE connected to the port-extender Ethernet segment, PE 10B includes a packet header to perform split-horizon for the extended-port where the traffic was received. For example, rather than discarding the 802.1BR header, forwarding engine 130 of PE 10B may push a port-extender ESI label to indicate to a receiving PE device to perform split-horizon and a label including the 802.1BR header comprising the ECID. A port-extender ESI label may indicate, to a PE device that receives a packet with the port-extender ESI label, that the receiving PE device is to perform split-horizon of the packet to drop the packet instead of forwarding the packet to the Ethernet segment corresponding to the ESI label that originated the packet. As described in FIG. 2, the port-extender ESI label may represent Ethernet segment 14A that is used in split-horizon by PE devices (e.g., PEs 10A, 10C, and 10D) connected to the same multi-homed Ethernet segment to a port-extender device. PE 10B may additionally push a label including the 802.1BR header that includes the ingress ECID corresponding to the ingress extended-port behind the port-extender device in order for the receiving PEs to fully identify the incoming extended-port (806).

PE 10B may forward the data packet including the one or more labels via one of outbound links 160 of PE 10B over the EVPN core (808). PE 10A may receive the data packet including the one or more labels via one of inbound links 158 of PE 10A (810). By including both port-extender ECID label and the 802.1BR header, PE 10A may apply split-horizon (812). For example, PE 10A may determine from the combination of port-extender ESI label and the ingress ECID included in the 802.1BR header that identifies the extended-port that originated the traffic, and may drop the packet.

In the example of FIG. 8B, PE 10B may learn of a first MAC address for CE devices behind extended-ports of port-extender 11A. As described in this disclosure, PE 10B may advertise to PE 10A an extended EVPN route, e.g., MAC advertisement route (Type-2) including the first MAC address and information on an extended-port where the first MAC address was learned (852). PE 10A may receive the EVPN route including the first MAC address and the extended-port for which the first MAC address was learned (854). PE 10A may store the first MAC address and information on the extended-port in a table, e.g., a MAC table (856).

Subsequently, PE 10B may forward a data packet including a second MAC address to PE 10A (858). PE 10A may receive the data packet including the second MAC address over EVPN network 2 (860). PE 10A may determine whether the second MAC address from the data packet is in the MAC table (862). That is, PE 10A may perform a lookup of the second MAC address in the MAC table to determine whether the second MAC address is identified in the MAC table. Based on the lookup, PE 10A may determine the second MAC address is the same as the first MAC address and may determine the extended-port for which the first MAC address was learned. PE 10A may then apply split-horizon on the data packet to not forward packets to the extended-port for which the first MAC address was learned (864).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples of the invention have been described. These and other examples are within the scope of the following claims.

What is claimed is:

1. A method comprising:
    receiving, by a first provider edge (PE) device of a plurality of PE devices and from a second PE device of the plurality of PE devices, an Ethernet Virtual Private Network (EVPN) route including information identifying an extended-port of a port-extender device associated with a port-extender Ethernet segment, wherein the plurality of PE devices is configured with an EVPN instance reachable by the port-extender Ethernet segment connecting the plurality of PE devices to the port-extender device;
    storing, by the first PE device, the information identifying the extended-port of the port-extender device associated with the port-extender Ethernet segment;
    receiving, by the first PE device and from a second PE device of the plurality of PE devices, a data packet comprising one or more labels identifying the port-extender Ethernet segment and the information identifying the extended-port; and
    applying split-horizon, by the first PE device, based on the one or more labels identifying the port-extender Ethernet segment and the information identifying the extended-port, to process the received data packet.

2. The method of claim 1,
    wherein the EVPN route comprises a Media Access Control (MAC) advertisement route describing MAC address reachability information for the port-extender Ethernet segment, the MAC advertisement route advertised by the second PE device of the plurality of PE devices.

3. The method of claim 1,
    wherein the EVPN route comprises a Border Gateway Protocol (BGP) Internet Group Management Protocol (IGMP) join synchronization route describing a multicast state of the port-extender Ethernet segment, the join synchronization route advertised by the second PE device of the plurality of PE devices.

4. The method of claim 1,
    wherein the information identifying the extended-port comprises a global identifier for a plurality of logical channels between a plurality of extended-ports of a plurality of port-extender devices and a plurality of interfaces of the first PE device.

5. The method of claim 1,
    wherein the information identifying the extended-port of the port-extender device associated with the port-extender Ethernet segment is an E-Channel Identifier (ECID) based on an Institute of Electrical and Electronics Engineers (IEEE) 802.1BR standard.

6. The method of claim 1, further comprising:
    receiving, by the second PE device and from the port-extender device, the data packet including a packet header, the packet header including the information identifying the extended-port;
    pushing, by the second PE device, the one or more labels identifying the port-extender Ethernet segment and the information identifying the extended-port from the packet header; and
    forwarding, by the second PE device and to the first PE device, the data packet including the one or more labels such that the first PE device is configured to apply split-horizon.

7. The method of claim 1, wherein storing the information identifying the extended-port of the port-extender device associated with the port-extender Ethernet segment comprises:
    storing the information in a Border Gateway Protocol (BGP) table comprising at least one of a MAC table or an IGMP snooping table.

8. The method of claim 1,
wherein the information identifying the port-extender Ethernet segment is assigned to the port-extender device.

9. The method of claim 8, further comprising:
executing, by the first PE device and based on the information identifying the extended-port of the port-extender device, a single designated forwarder election for the port-extender device.

10. A first provider edge (PE) device comprising:
a memory; and
one or more processors operably coupled to the memory, wherein the one or more processors and memory are configured to:
receive configuration data configuring the first PE device with an Ethernet Virtual Private Network (EVPN) instance reachable by a port-extender Ethernet segment connecting a plurality of PE devices, including the first PE device, to a port-extender device,
receive, from a second PE device of the plurality of PE devices, an EVPN route including information identifying an extended-port of the port-extender device associated with the port-extender Ethernet segment,
store the information identifying the extended-port of the port-extender device associated with the port-extender Ethernet segment,
receive, from the second PE device, a data packet comprising one or more labels identifying the port-extender Ethernet segment and the information identifying the extended-port; and
apply split-horizon, based on the one or more labels identifying the port-extender Ethernet segment and the information identifying the extended-port, to process the received data packet.

11. The first PE device of claim 10,
wherein the EVPN route comprises a Media Access Control (MAC) advertisement route describing MAC address reachability information for the port-extender Ethernet segment, the MAC advertisement route advertised by the second PE device of the plurality of PE devices.

12. The first PE device of claim 10,
wherein the EVPN route comprises a Border Gateway Protocol (BGP) Internet Group Management Protocol (IGMP) join synchronization route describing a multicast state of the port-extender Ethernet segment, the join synchronization route advertised by the second PE device of the plurality of PE devices.

13. The first PE device of claim 10,
wherein the information identifying the extended-port comprises a global identifier for a plurality of logical channels between a plurality of extended-ports of a plurality of port-extender devices and a plurality of interfaces of the PE device.

14. The first PE device of claim 10,
wherein the information identifying the extended-port of the port-extender device associated with the port-extender Ethernet segment is an E-Channel Identifier (ECID) based on an Institute of Electrical and Electronics Engineers (IEEE) 802.1BR standard.

15. The first PE device of claim 10, further comprising:
a Border Gateway Protocol (BGP) table for storing the information identifying the extended-port of the port-extender device associated with the port-extender Ethernet segment.

16. The first PE device of claim 15,
wherein the BGP table comprises at least one of a MAC table or an IGMP snooping table.

17. A non-transitory computer-readable medium comprising instructions for causing one or more programmable processors to:
receive configuration data configuring the PE device with an Ethernet Virtual Private Network (EVPN) instance reachable by a port-extender Ethernet segment connecting a plurality of PE devices, including the first PE device, to a port-extender device,
receive, from the second PE device of the plurality of PE devices, an EVPN route including information identifying an extended-port of the port-extender device associated with the port-extender Ethernet segment,
store the information identifying the extended-port of the port-extender device associated with the port-extender Ethernet segment,
receive, from the second PE device, a data packet comprising one or more labels identifying the port-extender Ethernet segment and the information identifying the extended-port; and
apply split-horizon, based on the one or more labels identifying the port-extender Ethernet segment and the information identifying the extended-port, to process the received data packet.

* * * * *